United States Patent

[11] 3,609,121

[72] Inventors Friedrich Lohse
   Allschwil;
   Rolf Schmid, Muenchenstein; Hans Batzer, Arlesheim, all of Switzerland
[21] Appl. No. 748,590
[22] Filed July 30, 1968
[45] Patented Sept. 28, 1971
[73] Assignee Ciba Limited
   Basel, Switzerland
[32] Priority Aug. 9, 1967
[33] Switzerland
[31] 11217/67

[54] CURABLE EPOXY RESIN COMPOSITIONS CONTAINING NOVEL DISECONDARY DIAMINES
11 Claims, No Drawings

[52] U.S. Cl.................................................. 260/47,
   117/127, 117/161, 161/184, 260/2, 260/9, 260/37, 260/830, 260/77.5, 260/563
[51] Int. Cl.............................................. C08g 30/14
[50] Field of Search............................................ 260/47 EP,
   2 EP, 563, 78.4 EP, 830 T, 79, 77.5 AP

[56] References Cited
FOREIGN PATENTS
868,733 5/1961 Great Britain................ 260/47 EP Primary Examiner—William H. Short
Assistant Examiner—T. Pertilla
Attorneys—Harry Goldsmith, Joseph G. Kolodny, Bryant W. Brennan and Edward J. Sites ABSTRACT: Curable epoxy resin mixtures suitable for use as casting, impregnating or laminating resins or binders, coacting or sealing compositions, characterized in that they contain I. a diepoxy compound containing two 1,2-epoxyethyl residues, II. a disecondary diamine of the formula

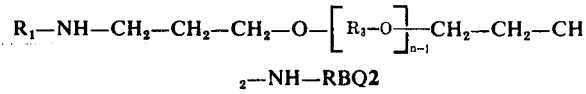

$$R_1-NH-CH_2-CH_2-CH_2-O-\left[R_3-O\right]_{n-1}-CH_2-CH_2-CH_2-NH-R_2$$

in an amount of 0.3 to 0.9, preferably 0.5 to 0.8 equivalent of active hydrogen atoms linked with nitrogen for every equivalent of epoxide groups of the diepoxy compound (I), in which formula $R_1$ and $R_2$ each represents a saturated carbocycle or cyclic system which may be unsubstituted or substituted by alkyl groups, containing at least five cyclic carbon atoms; $R_3$ represents the residue of a glycol or polyglycol from which the terminal hydroxyl groups have been removed, and $n=1$ or 2, and (III) a polyamine containing at least three active hydrogen atoms linked with nitrogen in an amount of 0.2 to 0.8, preferably 0.4 to 0.6 equivalent of active hydrogen atoms linked with nitrogen for every epoxide equivalent of the diepoxy compound (I).

CURABLE EPOXY RESIN COMPOSITIONS CONTAINING NOVEL DISECONDARY DIAMINES

The present invention provides new disecondary diamines of the formula (1) $R_1-NH-CH_2-CH_2-CH_2-O-\left[R_3-O\right]_{n-1}-CH_2-CH_2-CH_2-NH-R_2$ in which $R_1$ and $R_2$ each represents a saturated carbocycle or ring system with at least 5 cyclic carbon atoms, which may be unsubstituted or substituted by alkyl groups, $R_3$ represents the residue of a glycol or polyglycol from which the terminal hydroxyl groups have been removed and $n=1$ or 2, and a process for their manufacture, characterized in that diprimary diamines of the formula (2) 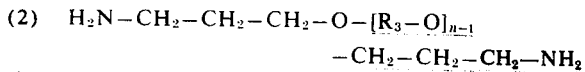

(in which $R_3$ and $n$ have the same meanings as in formula (1) are condensed with at least one cycloaliphatic ketone of the formula (3) 

to form the Schiff's base of the formula (4)

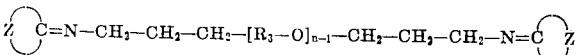

in which Z together with the carbon atom linked by a double bond with nitrogen and oxygen respectively forms a saturated or olefinically unsaturated carbocycle or ring system containing at least 5 cyclic carbon atoms, which may be substituted by alkyl side chains and the Schiff's base (4) is then hydrogenated to form the disecondary diamine of the formula (1).

The diprimary diamines of the formula (2) used as starting materials in the present process are readily accessible by the addition, catalyzed with sodium alcoholate, of acrylonitrile on to a glycol of the formula

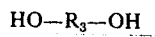

followed by hydrogenation of the resulting etherdinitrile in the presence of liquid ammonia to furnish the diprimary diamine according to the reaction equations

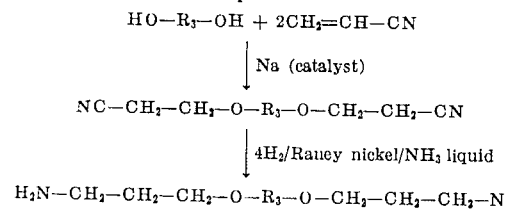

As glycols of the formula $HO-R_3-OH$ there may be used: Ethyleneglycol, propyleneglycol, butyleneglycol, hexamethyleneglycol and their dimers such as diethyleneglycol, dipropyleneglycol, dibutyleneglycol, polypropyleneglycol, polybutyleneglycol, polyhexamethyleneglycol, as well as cyclohexanedimethanols, quinitol and polyepichlorohydrin.

Diprimary diamines readily accessible by the above process, which are suitable for synthesizing the disecondary diamines of the formula (1), are for instance ethyleneglycol di(3-aminopropyl)ether, 1,3-propyleneglycol di(3-aminopropyl) ether, 1,4-butyleneglycol di(3-aminopropyl)ether, 1,6-hexamethyleneglycol di(3-aminopropyl)ether and the corresponding di(3-aminopropyl)ethers derived from the dimeric glycols, for example diethyleneglycol di(3-aminopropyl)ether and those which contain a polyalkyleneglycol residue, especially polypropyleneglycol di(3-aminopropyl)ether and polybutyleneglycol di(3-aminopropyl)ether.

As cycloaliphatic ketones (3) which may be condensed with the diprimary diamines of the formula (2) to furnish the Schiff's base (4) there may be mentioned for example, camphor, carvone, menthone, isophorone(=1,1,3-trimethyl-cyclohexen-3-one-5), methylcyclopentanone, cyclopentanone, methylcyclohexanone and especially cyclohexanone.

The above-described disecondary diamines of this invention are particularly suitable for use as curing components in curable epoxy resin mixtures. In this application, the present long-chain disecondary amines react first with epoxy resins containing two epoxide groups, which causes a smooth chain lengthening without cross-linking. In this manner chains may be synthesized that have several times the length of the etheramine; this leads to a distinct improvement in the mechanical properties of the final, cured shaped product.

The curing or the three dimensional cross-linking of the final product is achieved by the additional use of the diprimary amines, or the diprimary amines contained as impurities in the disecondary amines, as a further curing agent component.

For the above-mentioned use as curing agents for epoxy resins the long-chain disecondary etheramines have the further advantage that in general they are liquid at room temperature so that processing is considerably facilitated.

The cured final products are flexible bodies having a high tensile strength and elongation at rupture.

Accordingly, the present invention includes also curable epoxy resin mixtures suitable for use as casting, impregnating and laminating resins, as binders, coating and sealing compositions, characterized in that they contain (I) a diepoxy compound containing two 1,2-epoxyethyl residues, (II) a disecondary diamine of the formula (1) and (III) a polyamine containing at least three active hydrogen atoms linked with nitrogen in an amount of 0.2 to 0.8, preferably 0.4 to 0.6 equivalent of active hydrogen atoms linked with nitrogen for every epoxide equivalent of the diepoxy compound (I).

As diepoxy compounds (I) containing two 1,2-epoxyethyl residues

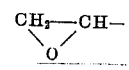

there are suitable, for example, butadiene diepoxide and divinylbenzene diepoxide.

Preferred use is made of diepoxy compounds (I) that contain two glycidyl groups.

There are suitable, or example, basic polyepoxy compounds obtained by reacting primary aromatic monoamines, such as aniline, toluidine, or secondary aromatic diamines such as 4,4'-di(monomethylamino)diphenylmethane with epichlorohydrin in the presence of alkali. Furthermore, diglycidyl compounds obtained by reacting epichlorohydrin with heterocyclic nitrogen bases such as hydantoin, 5,5-dimethylhydantoin, parabanic acid, ethylene-urea, for example N,N'-diglycidyl-5,5-dimethylhydantoin. Furthermore, it may be advantageous to use diglycidyl ethers or diglycidyl esters.

Preferred diglycidyl esters are those obtained by reacting a dicarboxylic acid with epichlorohydrin or dichlorohydrin in the presence of alkali. Such diesters may be derived from aliphatic dicarboxylic acids such as succinic, adipic or sebacic acid, from aromatic dicarboxylic acids such as phthalic, isophthalic or terephthalic acid, or more especially from hydroaromatic dicarboxylic acid such as $\Delta^4$-tetrahydrophthalic acid, 4-methyl-$\Delta^4$-tetrahydrophthalic acid, hexahydrophthalic acid or 4-methyl-hexahydrophthalic acid. As examples there may be mentioned diglycidyl adipate, diglycidyl phthalate, diglycidyl terephthalate, diglycidyl tetrahydrophthalate and diglycidyl hexahydrophthalate.

Preferred diglycidyl ethers are those obtained by etherifying a dihydric alcohol or diphenol with epichlorohydrin or dichlorohydrin in presence of alkali. These compounds may be derived from glycols such as ethyleneglycol, diethyleneglycol, triethyleneglycol, 1,3-propyleneglycol, 1,4-butanediol, 1,5-pentanediol, 1,6-hexanediol, from nitrogenous dialcohols, such as N-phenyldiethanolamine and especially from diphenols such as resorcinol, pyrocatechol, hydroquinone, 1,4-dihydroxynaphthalene, bis(p-hydroxyphenyl)methane, bis(p-hydroxyphenyl)tolylmethane, 4,4'-dihydroxydiphenyl, bis(p-hydroxyphenyl)sulphone or preferably from bis(p-hydroxyphenyl)dimethylmethane.

There may be mentioned, for example, 4,4-butanediol diglycidyl ether, resorcinol diglycidyl ether and especially the diglycidyl ethers derived from bis(p-hydroxyphenyl)dimethylmethane (bisphenol A), which correspond to the average formula

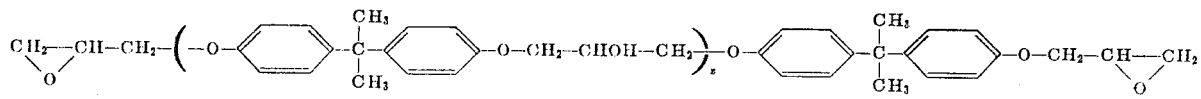

in which z is a whole or fractional small number, for example from 0 to 2.

Advantageous results have been obtained with diepoxy compounds of the following constitution (6)

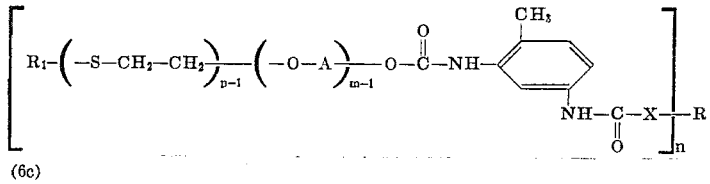

in which n is 2 or a greater digit, preferably 2 or 3; X represents an oxygen or a sulfur atom; R stands for an n-valent aliphatic residue which may be interrupted by oxygen or sulfur atoms or by carboxylic acid ester groups; $R_1$ represents an aliphatic residue containing a terminal 1,2-epoxyethyl group, which may be substituted by halogen atoms or interrupted by oxygen or sulfur atoms, or is preferably a 2,3-epoxypropyl group or a glycidyl group; A represents the residue of a glycol, polyglycol, thiodiglycol or poly(thiodiglycol) from which the terminal hydroxyl groups have been removed; $m = 1$ or 2 and $p = 1$ or 2, preferably 1, or mixtures of such diepoxy compounds with the aforementioned diglycidyl compounds.

As typical representatives of the type of compounds of formula (6) there may be mentioned, for example, the compounds of the following formulas:

(6a)

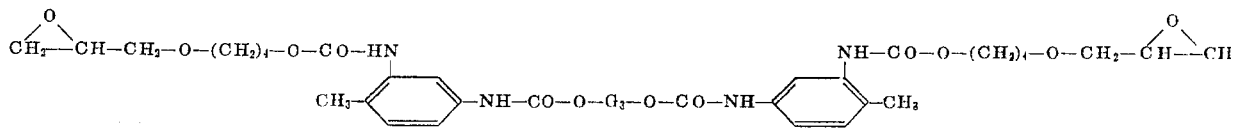

(where $G_1$ is the residue of a polyethyleneglycol HO—$G_1$—OH of average molecular weight 412, from which the terminal hydroxyl groups have been removed)

(6b)

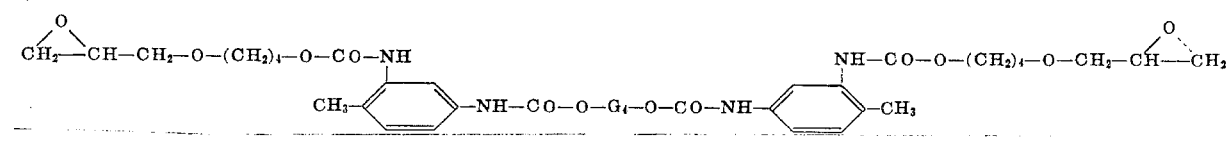

(where $G_2$ is the residue of polybutyleneglycol HO—$G_2$—OH of average molecular weight 654, from which the terminal hydroxyl groups have been removed)

(6c)

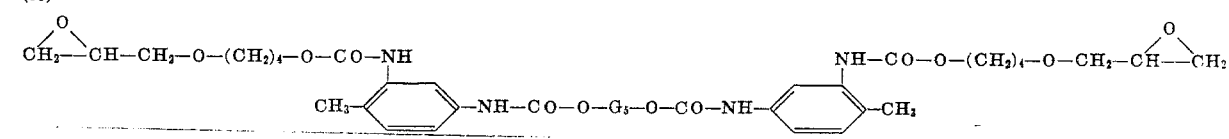

(where $G_3$ is the residue of polybutyleneglycol HO—$G_3$—OH of average molecular weight 980, from which the terminal hydroxyl groups have been removed)

(6d)

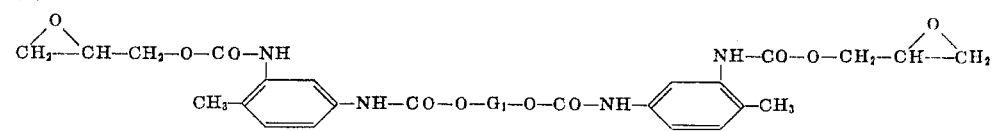

(where $G_4$ is the residue of polypropyleneglycol HO—$G_4$—OH of average molecular weight 440, from which the terminal hydroxyl groups have been removed)

(6e)

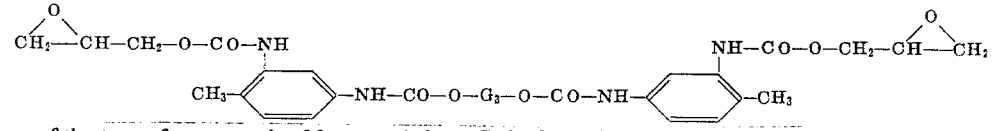

(where $G_5$ is the residue of polypropyleneglycol HO—$G_5$—OH of average molecular weight 874, from which the terminal hydroxyl groups have been removed)

(6f)

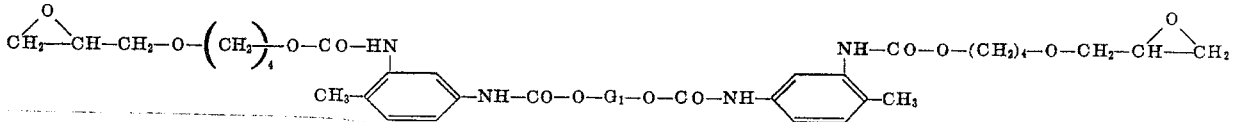

(where $G_1$ is the residue of a polyethyleneglycol of average molecular weight 412, from which the terminal hydroxyl groups have been removed)

(6g)

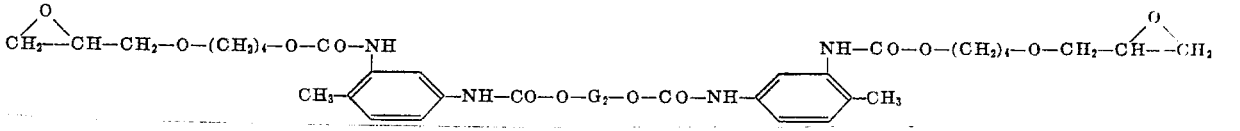

(where $G_3$ is the residue of a polyethyleneglycol of average molecular weight 980, from which the terminal hydroxyl groups have been removed).

The polyamines containing at least three amine hydrogen atoms, used as curing component (III) in the curable resin-curing agent mixtures of this invention belong preferably to the aliphatic or cycloaliphatic series, through those of the aromatic or araliphatic series may be used as well.

Polyamines that contain three or more secondary amino groups and no primary amino groups may likewise be used, but diprimary or primary-secondary polyamines are preferred.

Suitable aromatic and araliphatic polyamines are, for example, benzidine, 1,2-phenylenediamine, 1,3-phenylenediamine, 1,4-phenylenediamine, 4,4'-diaminodiphenylmethane, 4,4'-diaminodiphenylamine, 4,4'-diaminodiphenyl-dimethylmethane 4,4'-diaminodiphenyl-sulphide, -sulphone or -oxide, 4,4'-diaminodiphenylurea, 2,2'-diaminodiphenylmethane, N-phenylpropylenediamine, N-2-ethylphenyl-propylenediamine, N-4-phenylcyclohexyl-ethylenediamine, bis-$\beta$-aminoethyldurol, 1,4-bis-$\beta$-aminoethylbenzene, o-xylylenediamine, p-xylylenediamine and m-xylylenediamine.

From among the aliphatic polyamines there may be mentioned, for example, diprimary alkylenepolyamines such, for example, as ethylenediamine, diethylenetriamine, triethylenetetramine, tetraethylenepentamine, pentaethylenehexamine, 1,2-propylenediamine, 1,3-propylenediamine; N-hydroxyalkyl-alkylenepolyamines such, for example, as N-hydroxyethyl-ethylenediamine, N-hydroxyethyl-pentamethylenediamine, N-hydroxypropyl-tetramethylenediamine, N-hydroxyethyl-diethylenetriamine, N,N''-di-(hydroxyethyl)-diethylenetriamine, N-hydroxypropyl-diethylenetriamine, N,N''-di-(hydroxypropyl)-diethylenetriamine, N-hydroxyethyl-propylenediamine, N-hydroxypropyl-propylenediamine, N-hydroxyethyl-dipropylenetriamine. Preferred use is made of long-chain polyamines of the aliphatic series such as tetramethylenediamine, pentamethylenediamine, 2-[2-(2-aminoethoxy)-ethoxy]-ethylamine, butanediol-(1,4)-di(aminopropyl)-ether, 1,8-diaminooctane, 1,10-diaminodecane, 1,12-diaminododecane and especially hexamethylenediamine and commercial trimethyl-hexamethylenediamine (isomer mixture of 2,2,4-trimethyl-hexamethylenediamine and 2,4,4-trimethylhexamethylenediamine). Furthermore, it is advantageous to use polyamines of the cycloaliphatic and aliphatic-cycloaliphatic series such as 1,2-diaminocyclohexane, 1,4-diaminocyclohexane, 1,3-diaminocyclohexane, 1,2-diamino-4-ethylcyclohexane, 1,4-diamino-3,6-diethylcyclohexane, 1-cyclohexyl-3,4-diaminocyclohexane, bis[methylamino]-cyclohexane-1,4, dodecahydrobenzidine, N-cyclohexyl-propylenediamine-1,3, N-cyclohexyl-ethylenediamine, N,N'-dicyclohexyl-propylenediamine-1,2, N,N'-dicyclohexyl-diethylenetriamine, N,N'-di-[-ethylcyclohexyl]-propylenediamine, N,N'-di-(cyclohexylmethyl)-ethylenediamine, 1,8-diaminomethane and especially 4,4'-diaminodicyclohexylmethane, 3,3'-dimethyl-4,4'-diaminodicyclohexylmethane, 2,2-bis(4'-aminocyclohexyl)propane and diamines of the formula

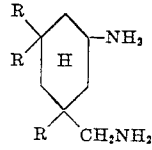

(where R is identical or different alkyls) such as preferably 3-(aminomethyl)-3,5,5-trimethyl-1-cyclohexyl-amine.

The curable mixtures of this invention are cured to form shaped structures in known manner either at room temperature or with heating, as a rule within the temperature range from 50° to 100° C.

The term "curing" as used in this context describes the conversion of the above-mentioned diepoxides into insoluble and infusible cross-linked products, as a rule with simultaneous shaping to furnish shaped structures such as castings, mouldings or laminates or flat two-dimensional structures such as lacquer films or adhesive bonds.

The curable mixtures of this invention may be admixed at any stage prior to curing with other conventional additives such as fillers, dyestuffs, pigments, flameproofing agents, mould release agents and the like. Suitable extenders and fillers are, for example, glass fibers, carbon fibers, boron fibers, mica, quartz meal, cellulose, burnt kaolin, ground dolomite, colloidal silica having a large specific surface (AEROSIL) or metal powders such as aluminum powder.

The importance of the flexibilized curable mixtures of this invention resides both in the electrotechnical sphere, for example as casting or impregnating resins, potting and encapsulating compositions, for example for potting electronic components, and in the mechanical sector, for example as laminating resins or "liners" for vessels and tubes manufactured by winding glass fibers, as adhesives and binders for metal, wood and synthetic materials or as coating or pointing materials for the building industry.

They may further be used with advantage in all technical spheres where conventional curable epoxy resin mixtures are employed, for example also as solvent-free paints, lacquers, dipping resins or moulding compositions.

Percentages in the following examples are by weight.

MANUFACTURING THE DISECONDARY DIAMINES

Example 1

490 grams (1 hydroxyl equivalent) of polybutyleneglycol of average molecular weight 1,000 were mixed with 350 mg. of sodium metal and while being vigorously stirred heated for about 90 minutes at 100° C. until all sodium had dissolved and formed the alcoholate. The brownish reaction mixture was then cooled to 40° C. and within 15 minutes 106.0 g. (2.0 mols) of acrylonitrile were dropped in so that the exothermic reaction, possibly with moderate cooling, caused the mixture to heat up again to 60° C. The batch was then stirred on for 6 hours at 60° C. For processing a quantity of concentrated hydrochloric acid equivalent to the weighed-in quantity of sodium, dissolved in 10 ml. of dioxan was added, the whole stirred for 30 minutes and 200 ml. of chloroform were added. The reaction mixture was mixed with 20 g. of anhydrous sodium sulphate, filtered and heated at 60° C. under 0.9 mm. Hg pressure until its weight remained constant. Yield: 507.0 g. of a low-viscous liquid. This crude product was mixed with 200 g. of liquid ammonia and 60 g. of Raney nickel and completely hydrogenated at 80° C. under 150 atmospheres hydrogen pressure. The hydrogenation mixture was filtered through diatomaceous earth (registered trademark Celite) and concentrated until its weight remained constant. The product formed a yellow oil which crystallized on standing and had an amine equivalent of 555 (theory 547). It consists of the amine of the formula $$NH_2-(CH_2)_3-O-R_{3a}-O-(CH_2)_3-NH_2$$

($R_{3a}$ = the residue of a polybutylenegylcol HO—$R_{3a}$—OH of average molecular weight 1,000, freed from the terminal hydroxyl groups).

467.5 grams (0.85 amine equivalent) of the product obtained above were mixed with 300 ml. of ethanol and 91.7 g. of cyclohexanone (0.85 mol + 10 percent excess), and the batch was completely hydrogenated with 50 g. of palladium carbon at 60° C. under a hydrogen pressure of 60 atmospheres in the course of about 1 hour, then filtered and concentrated at 60° C. under 0.1 mm. Hg pressure until its weight remained constant. Yield: 524 g. of a disecondary amine having an amine equivalent weight of 622 (theory 635, referred to the amine equivalent weight of the diprimary amine used above). The amine has the formula

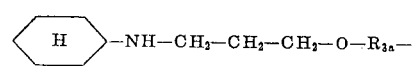

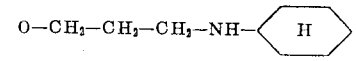

in which $R_{3a}$ is the residue of a polybutyleneglycol HO—$R_{3a}$—OH of average molecular weight 1,000, freed from its terminal hydroxyl groups.

Example 2

550 grams (2.5 hydroxyl equivalents) of a propyleneglycol of average molecular weight 425 were mixed with 500 mg. of sodium metal and heated to about 100° C., during which the sodium dissolved and formed the alcoholate. The solution was then cooled to 40° C. and within 20 minutes 159 g. (3 mols) of acrylonitrile were dropped in so that the reaction mixture could be maintained at 50° C. with moderate cooling. On completion of the addition the batch was allowed to react for another 7 hours at 50° C., then taken up in chloroform and washed neutral with saturated sodium chloride solution. The chromoform phase was dried with anhydrous sodium sulfate filtered and concentrated. The concentrate was mixed with 50 g. of Raney nickel and 350 g. of liquid ammonia and completely hydrogenated at 60° C. under a hydrogen pressure of 120 atmospheres. The hydrogenation was completed after 14½ hours. The hydrogenation mixture was filtered and concentrated. Yield: 648.9 g. of a reddish-brown crude product which had an amine equivalent weight of 315 (theory 277). When the hydrogenation progresses incompletely, the batch must be further hydrogenated with fresh Raney nickel under the conditions described above.

612.7 grams of the crude product were mixed with 300 ml. of ethanol, 200.8 g. of cyclohexanone and 50 g. of palladium carbon and hydrogenated at 60° C. under a hydrogen pressure of 60 atmospheres, which took 12 hours. The reaction mixture was filtered and concentrated, finally at 60° C. under 0.1 mm. Hg pressure, until its weight remained constant. Yield: 737.0 g. of a low-viscous product having an amine equivalent weight of 391 (theory 359, referred to the amine equivalent weight of the diprimary amine used above).

The product consists substantially of the disecondary diamine of the formula

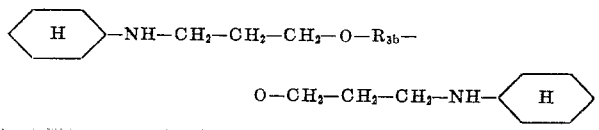

in which $R_{3b}$ is the residue of a polypropyleneglycol HO—$R_{3b}$—OH of average molecular weight 425, freed from the terminal hydroxyl groups.

Example 3

429 grams (3 hydroxyl equivalents) of polypropyleneglycol of average molecular weight 250 were mixed with 370 mg. of sodium metal which dissolved with vigorous stirring for 2 hours at 95° C. to form quantitatively the alcoholate. The reaction mixture was then cooled to 30° C. and in the course of 45 minutes 318 g. (6 mols) of acrylonitrile (stabilized with hydroquinone) were added, whereupon an exothermic reaction set in. By cooling with ice the temperature was allowed to rise from 30° C. to 60° C. After completion of the addition the batch was allowed to react for another 8 hours at 60° C., then filtered and concentrated. The concentrate was mixed with 500 g. of liquid ammonia and 100 g. of Raney nickel and completely hydrogenated at 70° C. under a hydrogen pressure of 150 atmospheres. On completion of the hydrogenation the batch was filtered and concentrated, to furnish 548.6 g. of reddish-brown, thinly liquid crude product having an amine equivalent weight of 199.5 (theory 200). This crude product was mixed with 279.3 g. of cyclohexanone and then with 50 g. of palladium carbon and completely hydrogenated at 60° C. under a hydrogen pressure of 60 atmospheres, which took about 15½ hours. After filtration and concentration until the weight remained constant, 748.0 g. of crude product resulted; it was a light reddish-brown liquid having an amine equivalent weight of 275 (theory 282, referred to the amine equivalent weight of the diprimary amine used above). The product consists mainly of the disecondary diamine of the formula

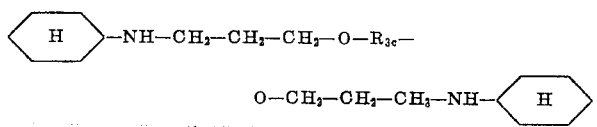

in which $R_{3c}$ is the residue of a polypropyleneglycol HO—$R_{3c}$—OH of average molecular weight 250, freed from the terminal hydroxyl groups.

Example 4

Instead of mixing the crude product of example 3 (548.6 g., amine equivalent weight 199.5) with cyclohexanone, the reducing alkylation may be performed with cyclopentanone as follows:

426.0 grams (2.18 amino group equivalents) of the above-named crude product were dissolved in 200 ml. of ethanol and mixed with 202.0 g. (2.18 mols + 10 percent excess) of cyclopentanone, whereupon slight heating up occurred. The reaction mixture was then mixed with 50 g. of palladium carbon (10% Pd) and completely hydrogenated at 60° C. under 60 atmospheres hydrogen pressure, which took 5½ hours. The batch was then filtered through Celite and concentrated to weight constancy, finally at 80° C. under 11 mm. Hg pressure, to yield 554.7 g. of a light-brown, low-viscous product having an amine equivalent weight of 274 (theory 263, referred to the amine equivalent weight of the diprimary amine used above). The product consists mainly of the disecondary diamine of the formula

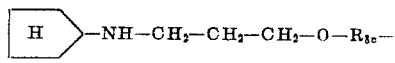

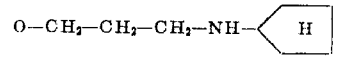

in which $R_{3c}$ is the residue of a polypropyleneglycol HO—$R_{3c}$—OH of average molecular weight 250, freed from the terminal hydroxyl groups.

Example 5

665 grams (4.65 hydroxyl equivalents) of polypropylenegylcol of average molecular weight 250 were mixed with 700 mg. of sodium metal and heated to 100° C. After 1 hour all sodium had dissolved to form the alcoholate. The reaction mixture was cooled to 18° C. and then mixed with 200 mg. of hydroquinone, and then within 1 hour 656 g. (12.4 mols) of acrylonitrile were dropped in, during which the exothermic reaction raised the temperature to 48° C. On completion of the addition the batch was stirred on for 18 hours at 60° C. Then a solution of concentrated hydrochloric acid in three times its volume of dioxan was added until all sodium added as catalyst had been neutralized. The brownish reaction mixture was thoroughly stirred for 30 minutes, then filtered and the filtrate concentrated at 70° C. under 9 mm. Hg until its weight remained constant, to yield 883.8 g. of a brown, viscous polyether dinitrile. This concentrate was hydrogenated with 500 g. of liquid ammonia at 80° C. and under 150 atmospheres (gauge), using as catalyst 100 g. of Raney nickel, which took 4 hours. The hydrogenation mixture was filtered through Celite and concentrated to weight constancy, finally at 60° C. under 0.4 mm. Hg. The resulting red-brown, thinly liquid product had an amine equivalent weight of 194.5. Yield: 852.1 g. of diprimary polyether diamine.

426 grams (2.19 amine equivalents) of the product obtained above were mixed with 200 ml. of ethanol and 235 g. (2.19 mols+10 percent excess) of cyclohexanone and hydrogenated with 50 g. of palladium carbon at 60° C. under 60 atmospheres pressure. The hydrogenation took 3 hours to completion. After filtering through Celite and concentrating the filtrate, finally at 80° C. under 0.1 mm. Hg until the weight remained constant, there were obtained 544 g. of a product having an amine equivalent weight of 279.5 (theory 277, referred to the amine equivalent of the diprimary amine used above). The product consists mainly of the disecondary diamine of the formula

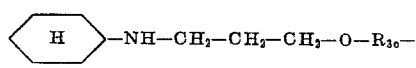

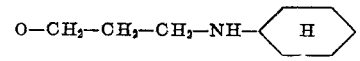

in which $R_{3c}$ is the residue of a polypropyleneglycol HO—$R_{3c}$—OH of average molecular weight 250, from which the terminal hydroxyl groups have been removed.

MANUFACTURING THE SHAPED STRUCTURES

Example I a. 185 grams of a bisphenol-A-diglycidyl ether, obtained by condensing epichlorohydrin with bis-(p-hydroxyphenyl)-dimethylmethane (bisphenol A) in the presence of alkali, which is liquid at room temperature and has an epoxide content of 5.35 epoxide equivalents per kilogram (epoxy resin A), were mixed at 50° C. with 165 g. of the disecondary diamine described in example 3 and with 21.3 g. of 3-aminomethyl-3,5,5,-trimethylcyclohexylamine (corresponding to a ratio of 1.0 epoxide equivalent of the epoxy resin A per 0.6 equivalent of amine hydrogen atom of the disecondary amine and 0.5 equivalent of amine hydrogen atom of the diprimary amine) at 60° C., subjected to a short vacuum treatment to remove the air bubbles, and then poured into the previously heated tensile body molds corresponding to DIN 16 946 and DIN 53 455 respectively, test mold 2 (4 mm. thick) or VSM 77 101, mold 2 (test bar 4 mm. thick). After curing for 16 hours at 100° C. a shaped body having the following properties resulted:

Tensile strength according to DIN 16 946 (DIN 53 455) = 115 kp/cm$^2$ elongation at rupture according to DIN 16 946 (DIN 53455) = 137%. The abbreviation kp stands for kiliponds.

(b) When 30 g are used instead of 21.3 g of 3-aminomethyl-3,5,5-trimethylcyclohexylamine (0.7 equivalent of amine hydrogen atom for every equivalent of epoxy resin A and otherwise identical composition and working up as in Example I(a)), the resulting shaped structures revealed the following properties:

Tensile strength according to DIN 16 946 (DIN 43 455) = 71 kp/cm$^2$ elongation at rupture according to DIN 16 946 (DIN 53 455) = 196% electrolytic corrosive effect, according to DIN 53 489, measured on test bars 4 mm thick A 1

(c) When 19 g of commercial trimethylhexamethylenediamine (isomer mixture of 2,4,4-trimethylhexamethylenediamine and 2,2,4-trimethylhexamethylenediamine) are used instead of 21.3 g of 3-aminomethyl-3,5,5-trimethylcyclohexylamine under otherwise identical conditions of composition and working up as described in Example I(a), the tensile bars revealed the following properties:

Tensile strength according to DIN 16 946 (DIN53455) 27 kp/cm.$^2$ elongation at rupture according to DIN 16 946 (DIN53455) 141%.

d. When 235 g. of the disecondary diamine of example 2 were used instead of the diamine of example 3 under otherwise identical conditions of composition and working up as described in example Ia, the test bars revealed the following properties:

Tensile strength according to DIN 16 946 (DIN4555345515 kp/cm.$^2$ elongation at rupture according to DIN 16 946 (DIN53455) 195%.

e. When 363 g. of a disecondary diamine of example 1 were used under otherwise identical conditions of composition and working up as described in example Ia, the test bars revealed the following properties:

Tensile strength according to DIN 16 946 (DIN455534557 kp/cm.$^2$ elongation at rupture according to DIN 16 946 (DIN53455) 100%.

Example II a. 133 grams of Δ$^4$-tetrahydrophthalic acid diglycidyl ester containing 6.4 epoxide equivalents per kilogram (epoxy resin B), 115.5 g. of a polyurethane diglycidyl compound of the formula

[where G$_3$ is the residue (freed from the terminal hydroxyl groups) of the polybutyleneglycol of average molecular weight 1,000, containing 1.3 epoxide equivalents per kilogram (epoxy resin C)], 165 g. of the disecondary diamine of example 3 and 21.3 g. of 3-aminomethyl-3,5,5-trimethylcyclohexylamine (corresponding to a ratio of 0.85 epoxide equivalent of the epoxy resin B and 0.15 epoxide equivalent of the epoxy resin C to every 0.6 equivalent of amine hydrogen atom of the disecondary amine and 0.5 equivalent of amine hydrogen atom of the diprimary amine) were mixed at 70° C. and after a short vacuum treatment to remove the air bubbles poured into the preheated tensile bar molds. After curing for 16 hours at 100° C. the tensile bodies revealed the following values:

Tensile strength according to DIN 16 946 (DIN53455), 8 kp/cm.$^2$ elongation at rupture according to DIN 16 946 (DIN53455), 225%.

b. When 157 g. of a liquid bisphenol A diglycidyl ether (epoxy resin A; 0.85 epoxide equivalent) according to example Ia were used instead of 133 g. of tetrahydrophthalic acid diglycidyl ester under otherwise identical conditions of composition and working up as described in example IIa, the moldings revealed the following properties:

Tensile strength according to DIN 16 946 (DIN53455), 13 kp/cm.$^2$ elongation at rupture according to DIN 16 946 (DIN53455), 126%.

Example III 400 grams of a bisphenol-A-diglycidyl ether containing 2.5 epoxide equivalent per kilogram were heated to 90° C. To this resin a mixture of 235 g. of disecondary diamine according to example 2 and 21.3 g. of 3-aminomethyl-3,5,5-trimethylcyclohexylamine were added (corresponding to a ratio of 1.0 epoxide equivalent of the epoxy resin: 0.6 equivalent amine hydrogen atom of the disecondary amine and 0.5 equivalent amine hydrogen atom of the diprimary amine). The resin+curing agent mixture was thoroughly stirred and subjected to a short vacuum treatment, poured into the preheated tensile bar molds and cured for 16 hours at 140° C. The moldings revealed the following properties:

Tensile strength according to DIN 16 946 (DIN53455), 110 kp/cm.$^2$ elongation at rupture according to DIN 16 946 (DIN53455) 107%.

Comparative Test

By using 154.5 g. (0.6 equivalent of the disecondary amine) of a disecondary diamine, manufactured according to the process of DAS 1,215,373 from polypropyleneglycol of average molecular weight 425 and cyclohexylamine, the manufacture of which is described below, of otherwise identical composition and processing, there were obtained already after 16 hours' curing at 80° C. shaped structures having a high rigidity and low flexibility, which revealed the following mechanical strength values:

Tensile strength according to DIN 16 946 (DIN53455), 420 kp/cm.$^2$ elongation at rupture according to DIN 16 946 (DIN53455) 4%.

When the disecondary amine (example 2) manufactured by the present process is used as curing agent for epoxy resins, shaped structures are obtained which, compared with shaped structures manufactured from the same starting materials but with the amine obtained according to the process of DAS 1,215,373, are distinguished by a substantially greater toughness and flexibility.

Manufacturing a disecondary diamine by the process of DAS 1,215,373:

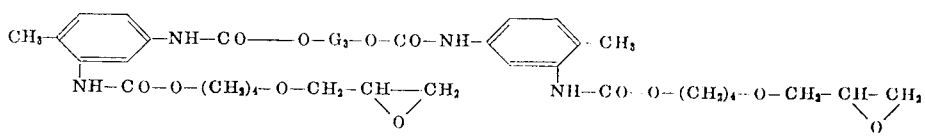

In an autoclave 830 g. (4 hydroxyl equivalents) of polypropyleneglycol of average molecular weight 425 were mixed with 1,980 g. (20 mols) of cyclohexylamine, and 100 g. of Raney nickel were added. The batch was then heated for 3 hours at 220° C. under an initial hydrogen pressure of 20 atmospheres (gauge), during which the pressure rose to 50 and in the course of the following 6 hours to 70 atmospheres. During the whole operation the temperature was kept constant at 220° C. The reaction was then discontinued, the batch cooled, detensioned, filtered and then concentrated at a bath temperature of 80° C. under 0.2 mm. Hg pressure until its weight remained constant. Yield: 1,242.5 g. of crude product having an amine equivalent weight of 258. The product is a relatively low-viscous liquid of olive color.

Example IV 122 grams of a bisphenol A diglycidyl ether containing 5.35 epoxide equivalents per kilogram, 132 g. of a bisphenol A diglycidyl ether containing 2.5 epoxide equivalents per kilogram, 165 g. of the disecondary diamine of example 4 and 29.8 g. of 4,4'-diamino-3,3'-dimethyl-dicyclohexylmethane (corresponding to a ratio of 1.0 total epoxide equivalent [0.67 and 0.33]: 0.6 equivalent of amine hydrogen atom of the disecondary amine and 0.5 equivalent of amine hydrogen atom of the diprimary amine) were heated to 80° C., thoroughly mixed and after a short vacuum treatment to remove the air bubbles poured into the preheated tensile body molds. After curing for 16 hours at 50° C. the shaped structures revealed the following properties:

Tensile strength according to DIN 16 946 (DIN53455), 154 kp/cm.² elongation at rupture according to DIN 16 946 (DIN53455) 163%.

Example V 185 grams of epoxy resin A were mixed at 60° C. with 168 g. of the disecondary amine of example 5 and 21.3 g. of 3-aminomethyl-3,5,5-trimethylcyclohexylamine (corresponding to a ratio of 0.6 equivalent of disecondary amine and 0.5 equivalent of amino hydrogen of the diprimary amine for every equivalent of epoxy resin) and after a short vacuum treatment to remove the air bubbles poured into the preheated tensile bar molds of example I. After 16 hours' curing at 90° C. shaped structures were obtained which revealed the following properties:

Tensile strength according to DIN 16 946 (DIN53455), 150 kp/cm.² elongation at rupture according to DIN 16 946 (DIN53455) 220%.

Comparative Test

When 122.5 g. (0.6 equivalent of the disecondary amine) of a disecondary diamine obtained by the process of DAS 1,215,373 from polypropyleneglycol of average weight 250 and cyclohexylamine, whose manufacture is described below, and otherwise identical composition and processing and curing conditions were used, shaped structures having the following properties were obtained:

Tensile strength according to DIN 16 946 (DIN53455), 430 kp/cm.² elongation at rupture according to DIN 16 946 (DIN53455) 5%.

When the disecondary amine manufactured according to the present process (example 5) was used as curing agent for epoxy resins, the resulting shaped structures, compared with shaped structures manufactured from an amine prepared from the identical starting materials but by the process of DAS 1,215,373, displayed a substantially higher toughness and flexibility.

Manufacturing a disecondary amine according to the process of DAS 1,215,373.

In an autoclave 135 g. (1 hydroxyl equivalent) of a polypropyleneglycol of average molecular weight 250 were mixed with 990 g. (10 mols) of cyclohexylamine, and 20 g. of Raney nickel were added. The batch was heated for 2 hours at 220 C. under an initial hydrogen pressure of 20 atmospheres (gauge), during which the pressure rose to 40 atmospheres and during the following 6 hours to a maximum of 60 atmospheres. The reaction was then discontinued, the batch cooled, detensioned and filtered and then concentrated at 80° C. bath temperature under 0.1 mm. Hg pressure until its weight remained constant. Yield: 282.5 g. of crude product having an amine equivalent weight of 204. The product is a relatively low-viscous brown liquid.

We claim:

1. A curable composition of matter which comprises
I. a diepoxy containing two 1,2-epoxyethyl residues,
II. a disecondary diamine of the formula

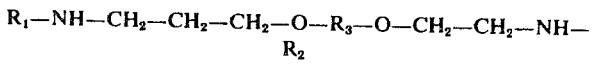

in an amount of 0.3 to 0.9 equivalent of active hydrogen atoms linked with nitrogen for every equivalent of epoxide groups of the diepoxy compound (I), in which $R_1$ and $R_2$ each are members selected from the group consisting of unsubstituted saturated carbocycle with five to six endocyclic carbon atoms and alkyl substituted saturated carbocycle with five to six endocyclic carbon atoms; $R_3$ represents the residue obtained by removing the terminal hydroxyl groups from a member selected from the group consisting of glycols and polyglycols and (III) a polyamine containing at least three active hydrogen atoms linked with nitrogen in an amount of 0.2 to 0.8 equivalent of active hydrogen atoms linked with nitrogen for every epoxide equivalent of the diepoxy compound (I).

2. A curable composition of matter which comprises
I. a diepoxy containing two 1,2-epoxyethyl residues,
II. a disecondary diamine of the formula

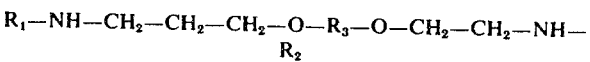

in an amount of 0.5 to 0.8 equivalent of active hydrogen atoms linked with nitrogen for every equivalent of epoxide groups of the diepoxy compound (I), in which $R_1$ and $R_2$ each are members selected from the group consisting of unsubstituted saturated carbocycle with five to six endocyclic carbon atoms and alkyl substituted saturated carbocycle with five to six endocyclic carbon atoms; $R_3$ represents the residue obtained by removing terminal hydroxyl groups from a member selected from the group consisting of glycols and polyglycols and (III) a polyamine containing at least three active hydrogen atoms linked with nitrogen in an amount of 0.4 to 0.6 equivalent of active hydrogen atoms linked with nitrogen for every epoxide equivalent of the diepoxy compound (I).

3. A composition according to claim 1, containing as diepoxy (I) a diglycidyl compound.

4. A composition according to claim 3, containing as diglycidyl compound the diglycidyl ether of a diphenol.

5. A composition according to claim 2, containing as diglycidyl compound the diglycidyl ester of a dicarboxylic acid.

6. A composition according to claim 2, containing as diepoxy (I) a compound of the formula

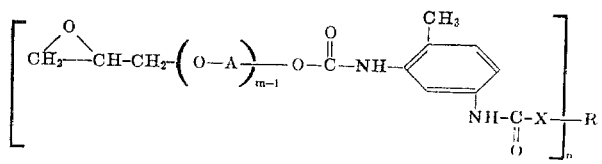

in which $n$ is an integer of at least 2 and at most 3; X is a member selected from the group consisting of oxygen and sulfur atom, R is the radical which is obtained by removing the hydroxyl group from an aliphatic polyhydroxy compound with at least two and at most three hydroxyl groups, A represents the radical which is obtained by removing the terminal hydroxyl groups from a member selected from the group consisting of glycol, polyglycol, thiodiglycol and poly(thiodiglycol) and $m$ is an integer of at least 1 and at most 2.

7. A composition according to claim 1, in which the polyamine containing at least three active hydrogen atoms linked with nitrogen is a diprimary polyamine.

8. A composition according to claim 7, containing as diprimary polyamine a member selected from the group consisting of cycloaliphatic and aromatic diprimary polyamine.

9. A composition according to claim 8, containing as cycloaliphatic diprimary polyamine 3-aminomethyl-3,5,5-trimethylcyclohexylamine.

10. A composition according to claim 8, containing as cycloaliphatic diprimary polyamine 4,4'-diaminodicyclohexylmethane.

11. A composition according to claim 7, containing as diprimary polyamine a member selected from the group consisting of hexamethylenediamine, 2,4,4-trimethylhexamethylenediamine and 2,2,4-trimethylhexamethylenediamine.